No. 733,512. PATENTED JULY 14, 1903.
B. F. ROBINSON.
GRAIN OR FERTILIZER DRILL OR DISTRIBUTER.
APPLICATION FILED FEB. 14, 1903.
NO MODEL.
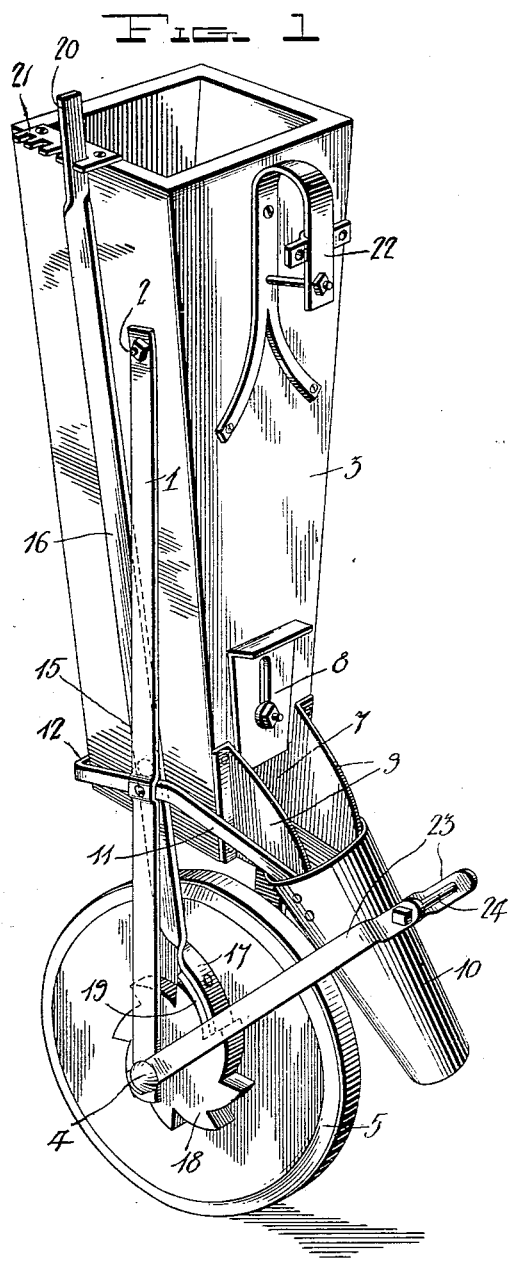
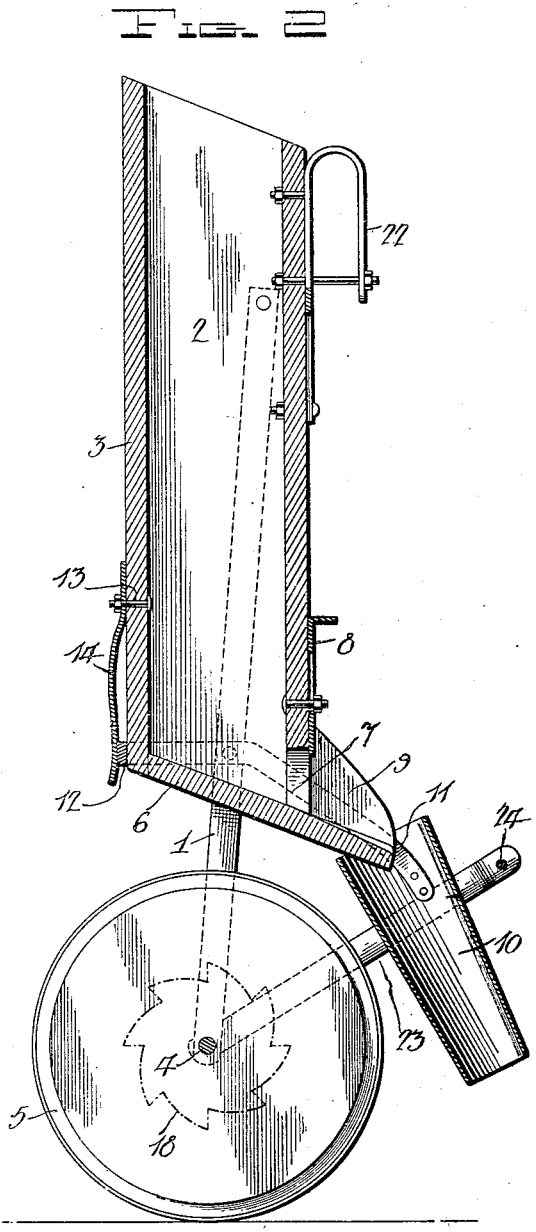
Witnesses
Inventor
Benjamin F. Robinson
By W. W. Dudley & Co.
his Attorneys No. 733,512. Patented July 14, 1903.

UNITED STATES PATENT OFFICE.

BENJAMIN F. ROBINSON, OF CAMPHILL, ALABAMA.

GRAIN OR FERTILIZER DRILL OR DISTRIBUTER.

SPECIFICATION forming part of Letters Patent No. 733,512, dated July 14, 1903.

Application filed February 14, 1903. Serial No. 143,290. (No model.)

*To all whom it may concern:*

Be it known that I, BENJAMIN F. ROBINSON, a citizen of the United States, residing at Camphill, in the county of Tallapoosa and State of Alabama, have invented certain new and useful Improvements in Grain or Fertilizer Drills or Distributers; and I do hereby declare the following to be a full, clear, and exact description of the invention, such as will enable others skilled in the art to which it appertains to make and use the same.

This invention relates to grain and fertilizer drills or distributers and is an improvement on the machine for which Letters Patent No. 674,429 were issued to me May 21, 1901.

The nature of the present improvements will be readily comprehended, reference being had to the following detailed description and to the accompanying drawings, in which—

Figure 1 is a perspective view of a grain and fertilizer drill or distributer embodying my present improvements. Fig. 2 is a vertical longitudinal sectional view of the same.

Referring to the drawings by numerals, 1 1 designate frame members, to the upper ends of which is pivoted by bolts 2 2 a vibratory hopper 3 for the grain or fertilizer, dependent upon which material is to be distributed, the pivotal point of the hopper being toward its upper end.

4 is a bolt passed through holes in the lower ends of the frame members to connect them and provide the axle for a supporting-wheel 5.

The hopper has an open top and a closed bottom 6, which slopes to and extends beyond the front wall of the hopper, in which is a delivery-outlet 7, controlled by an adjustable gate 8 of the sliding type. The extension of the bottom 6 is flanked by side plates 9 9, said plates and extension providing a trough to direct the material discharging from the outlet 7 to a distributing-nozzle 10, which is supported from the frame members 1 1 by arms 11 11, secured to the frame members at offsets in the latter, as shown in Fig. 1.

12 is a yoke which may be integral with the arms 11 11 and which extends around the lower end of the hopper at the rear thereof. Secured to the rear wall of the hopper by a bolt and nut 13 is a flat spring 14, which bears at its lower end against the outer side of the yoke and forcibly holds the lower end of the hopper against the inner side of said yoke. At one side of the hopper is pivoted by a bolt 15 an arm 16, the pivotal point being close to the bottom of the hopper. The lower end 17 of the arm is in the path of teeth on a ratchet-wheel 18, secured to the side of the wheel 5 to rotate therewith, and interposed between said end 17 and the ratchet-wheel and secured to said end is a plate 19, which receives the wear resulting from the contact with the rotating ratchet-wheel. The upper end 20 of the arm 16 is in engagement with any one of a number of teeth provided on a plate 21, secured on the top of the hopper. The arm 16 in the operation of the machine is rigid with the hopper, and in the rotation of the wheel 5 and ratchet-wheel 18 the lower end 17 of the arm is engaged by the ratchet-wheel teeth successively, with the result of vibrating the hopper and effecting the distribution of the material. By moving the arm 16 to cause its upper end to engage different teeth on the plate 21 the lower end 17 of said arm is brought nearer to or farther from the ratchet-wheel, whereby to vary the extent of vibrations of the hopper, and by this means the distribution of the material is readily controlled independently of the adjustment of the gate 8.

The machine is adapted to be attached to the stock of a common plow, and to this end is provided with the upper U-shaped spring-bracket 22, secured to the front wall of the hopper, and with lower arms and bolt 23 23 and 24, secured to the axle-bolt 4.

It will be noted that the means 22 for securing the upper end of the hopper to the plow-stock is such as to provide for a yielding connection, thereby relieving the parts from undue strain.

I claim as my invention—

1. A machine of the class described, having a frame, a hopper pivoted to the frame, a wheel carrying an annular series of shoulders, a yoke extending rearwardly of the frame, a flat spring carried by the hopper and engaging the yoke to press the lower end of the hopper against the latter, and an arm on the hopper extending into the path of the shoulders.

2. A machine of the class described, having a frame, a hopper pivoted near its upper end to the frame, a wheel, a ratchet-wheel fixed to the wheel to rotate therewith, a yoke extending rearwardly of the frame, a spring operating to press the lower end of the hopper against said yoke, an arm adjustable on the hopper to bring its lower end more or less into the path of the ratchet-wheel teeth, and a wear-plate at the lower end of the arm.

3. A machine of the class described, having a frame, a hopper pivoted to said frame, a wheel, a ratchet-wheel rotatable with said wheel, a yoke extending rearwardly of the frame, a flat spring on the hopper bearing against the yoke, and an arm on the hopper having its lower end in the path of the ratchet-wheel teeth.

4. A machine of the class described, having means toward its upper end for connection with a plow-stock, said means including a U-shaped spring-bracket whereby the connection is made flexible.

In testimony whereof I affix my signature in presence of two witnesses.

BENJAMIN F. ROBINSON.

Witnesses:
HOMER S. BRUCE,
W. J. CARLISLE.